US009829682B2

(12) United States Patent
Hsu et al.

(10) Patent No.: US 9,829,682 B2
(45) Date of Patent: Nov. 28, 2017

(54) OPTICAL IMAGING LENS AND ELECTRONIC DEVICE COMPRISING THE SAME

(71) Applicants: Sheng-Wei Hsu, Taichung (TW); Tzu-Chien Tang, Taichung (TW)

(72) Inventors: Sheng-Wei Hsu, Taichung (TW); Tzu-Chien Tang, Taichung (TW)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 1 day.

(21) Appl. No.: 14/740,266

(22) Filed: Jun. 16, 2015

(65) Prior Publication Data

US 2016/0282586 A1  Sep. 29, 2016

(30) Foreign Application Priority Data

Mar. 27, 2015  (TW) .............................. 104110085 A

(51) Int. Cl.
  *G02B 13/18*  (2006.01)
  *G02B 9/60*  (2006.01)
  *G02B 13/00*  (2006.01)
  *G02B 7/02*  (2006.01)

(52) U.S. Cl.
  CPC ........... *G02B 13/0045* (2013.01); *G02B 7/02* (2013.01); *G02B 9/60* (2013.01)

(58) Field of Classification Search
  CPC . G02B 9/00; G02B 9/60; G02B 13/00; G02B 13/0015; G02B 13/002; G02B 13/0045; G02B 13/008; G02B 13/14; G02B 13/18
  See application file for complete search history.

(56) References Cited

U.S. PATENT DOCUMENTS

| 8,179,614 B1* | 5/2012 | Tsai | G02B 13/0045 359/714 |
| 8,773,767 B2* | 7/2014 | Chang | G02B 9/60 359/714 |
| 2010/0254029 A1* | 10/2010 | Shinohara | G02B 9/60 359/764 |
| 2012/0069455 A1* | 3/2012 | Lin | G02B 13/0045 359/714 |

(Continued)

FOREIGN PATENT DOCUMENTS

| CN | 102466867 | 5/2012 |
| JP | 2013156389 | 8/2013 |

(Continued)

*Primary Examiner* — Thong Nguyen
(74) *Attorney, Agent, or Firm* — Winston Hsu

(57) ABSTRACT

An optical imaging lens, an image-side surface of a second lens element has a concave part in a vicinity of its periphery; an object-side of a third lens element has a concave part in a vicinity of its periphery; an object-side surface of a fourth lens element has a concave part in a vicinity of the optical axis, and a concave part in a vicinity of its periphery; an image-side surface of the fourth lens element has convex part in a vicinity of its periphery; an object-side surface of a fifth lens element has a convex part in a vicinity of the optical axis; an image-side surface of the fifth lens element has a concave part in a vicinity of the optical axis, and has convex part in a vicinity of its periphery. The imaging lens satisfies the relationship $|V1-V3| \geq 20$ and $EFL/(G34+G45) \leq 4.8$.

13 Claims, 26 Drawing Sheets

(56) References Cited

U.S. PATENT DOCUMENTS

2013/0258164 A1* 10/2013 Chang ................. G02B 9/60
                                                          348/345
2013/0342919 A1* 12/2013 Tang ................ G02B 13/0045
                                                          359/714
2014/0293445 A1* 10/2014 Yoneyama ......... G02B 13/0045
                                                          359/714

FOREIGN PATENT DOCUMENTS

| TW | 201213926 | 4/2012 |
| TW | I437261 | 5/2014 |
| TW | I438520 | 5/2014 |
| TW | M479425 | 6/2014 |

* cited by examiner

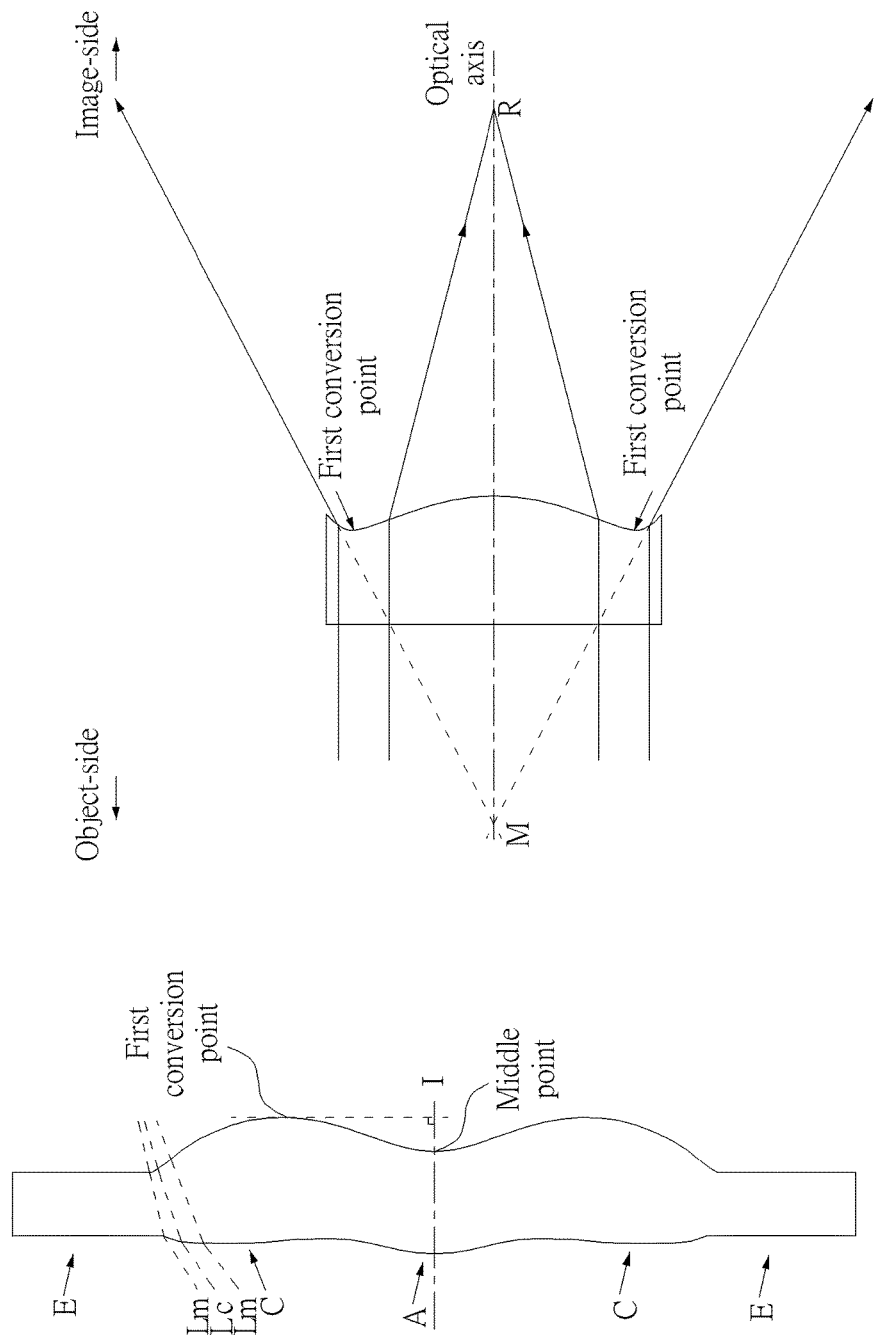

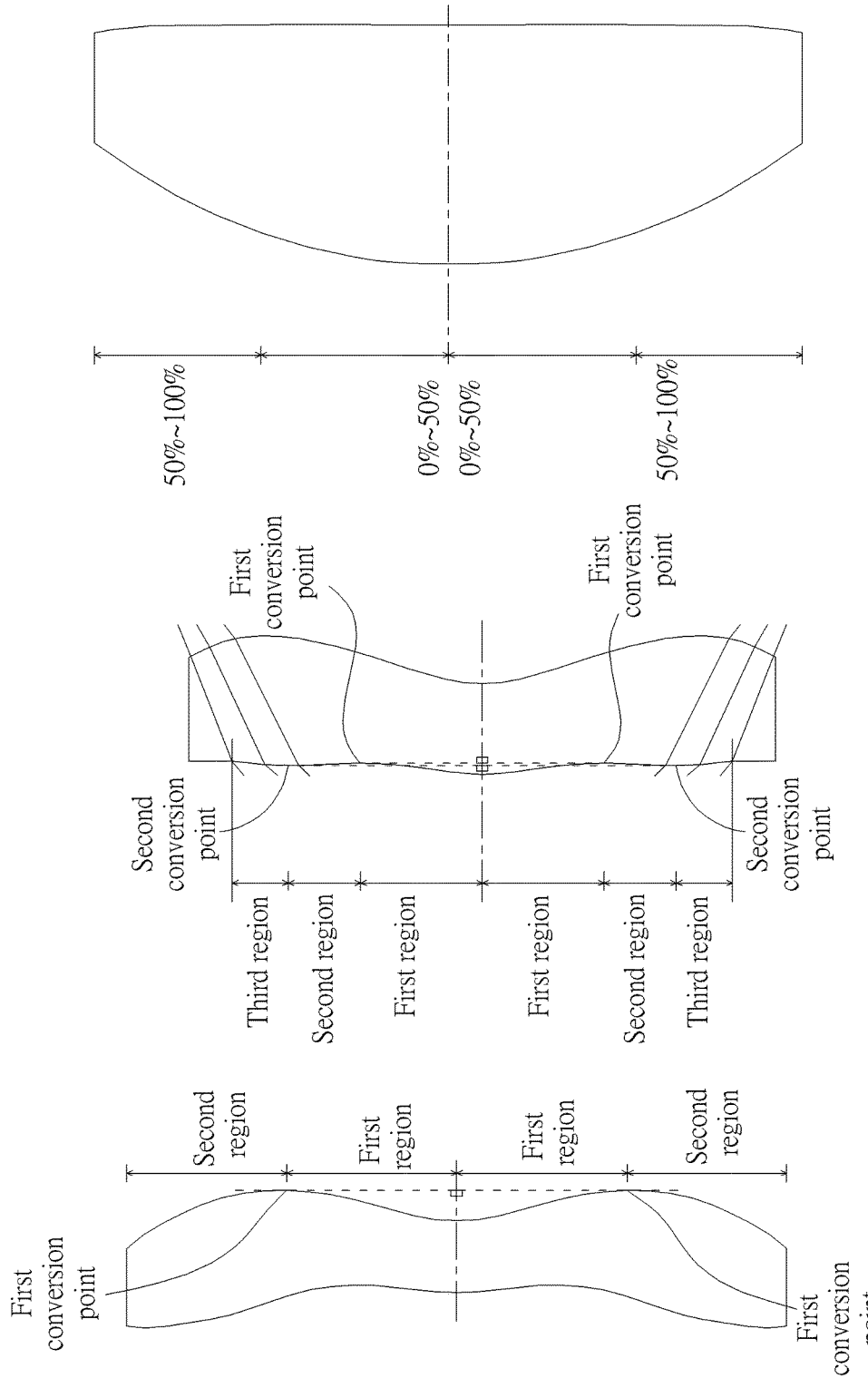

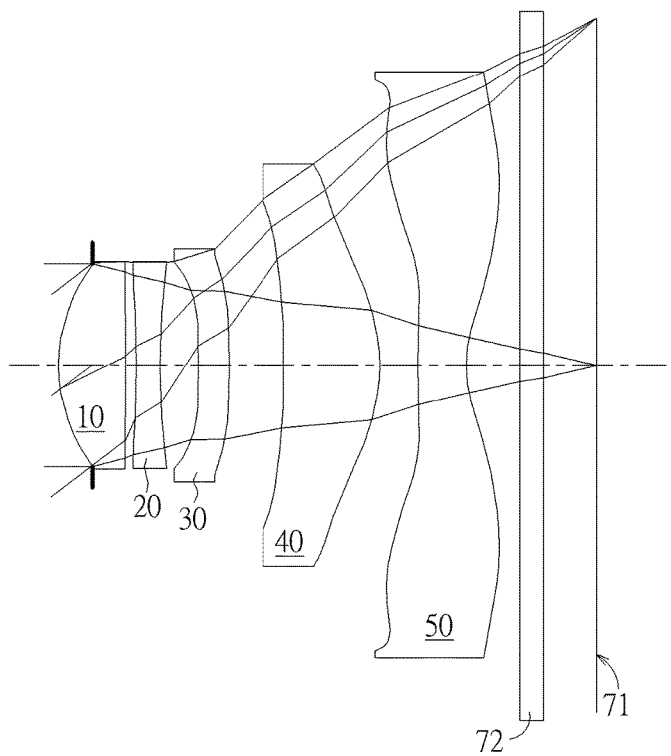
FIG. 8
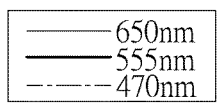
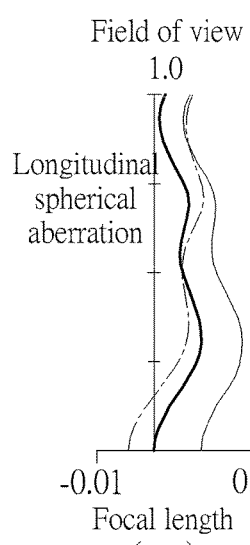
FIG. 9A
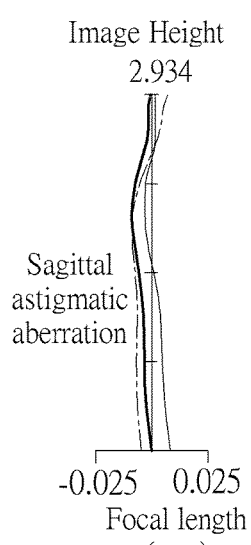
FIG. 9B
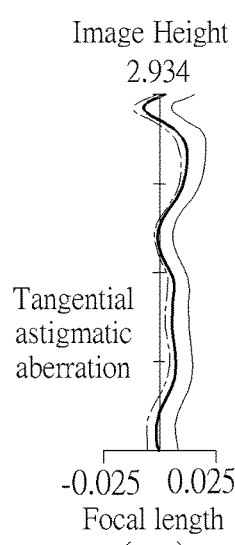
FIG. 9C
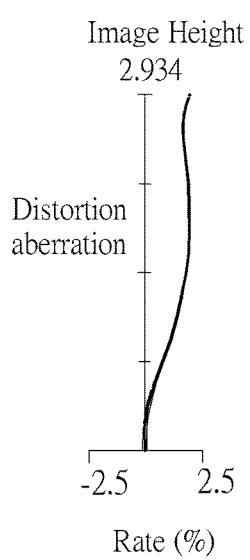
FIG. 9D

| First Example |||||||
|---|---|---|---|---|---|---|
| EFL(Effective Focal Length)=3.738 mm, HFOV(Half Field Of View)= 37.548 deg., Total length=4.535mm, Fno=2.2 |||||||
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.281 | | | | |
| 11 | First Lens | 1.419 | 0.567 | 1.546 | 56.114 | Plastic | 2.732 |
| 12 | | 24.910 | 0.081 | | | | |
| 21 | Second Lens | -7.369 | 0.200 | 1.648 | 22.397 | Plastic | -5.754 |
| 22 | | 7.627 | 0.309 | | | | |
| 31 | Third Lens | -12.676 | 0.254 | 1.648 | 22.397 | Plastic | -48.555 |
| 32 | | -21.398 | 0.448 | | | | |
| 41 | Fourth Lens | -10.272 | 0.825 | 1.546 | 56.114 | Plastic | 3.322 |
| 42 | | -1.585 | 0.331 | | | | |
| 51 | Fifth Lens | 2.910 | 0.416 | 1.546 | 56.114 | Plastic | -2.808 |
| 52 | | 0.953 | 0.450 | | | | |
| 72 | Filter | INFINITY | 0.210 | | | | |
| | | INFINITY | 0.442 | | | | |
| 71 | Image Plane | INFINITY | 0.002 | | | | |

FIG.22

| First Example |||||||
|---|---|---|---|---|---|---|
| Aspheric coefficients |||||||
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | 2.787324E-04 | -6.081895E-02 | -6.096279E-02 | -3.747965E-02 | -2.957731E-01 | -2.058384E-01 |
| a6 | 5.302252E-02 | 7.853463E-02 | 3.754898E-01 | 3.211098E-01 | 8.886899E-02 | 1.106359E-01 |
| a8 | -1.584708E-01 | 2.450694E-01 | -5.157335E-01 | -6.086162E-01 | -5.511035E-01 | -5.604699E-01 |
| a10 | 2.469960E-01 | -1.006473E+00 | 2.119993E-01 | 5.577877E-01 | 1.699884E+00 | 2.122076E+00 |
| a12 | -1.513243E-01 | 1.320982E+00 | 1.848735E-01 | -2.856019E-01 | -3.357663E+00 | -4.456944E+00 |
| a14 | 0.000000E+00 | -6.703434E-01 | -1.633476E-01 | 0.000000E+00 | 3.233293E+00 | 5.446442E+00 |
| a16 | 0.000000E+00 | 0.000000E+00 | 0.000000E+00 | 0.000000E+00 | -1.150428E+00 | -3.515731E+00 |
| a18 | 0.000000E+00 | 0.000000E+00 | 0.000000E+00 | 0.000000E+00 | 0.000000E+00 | 9.785565E-01 |
| a20 | 0.000000E+00 | 0.000000E+00 | 0.000000E+00 | 0.000000E+00 | 0.000000E+00 | 0.000000E+00 |
| Surface # | 41 | 42 | 51 | 52 | | |
| K | 0.000000E+00 | -9.826544E-01 | 0.000000E+00 | -4.532582E+00 | | |
| a4 | 1.102577E-02 | 4.146550E-02 | -4.731323E-01 | -1.904368E-01 | | |
| a6 | -6.331935E-02 | -2.643916E-02 | 4.064245E-01 | 1.515114E-01 | | |
| a8 | 5.563624E-02 | 7.677397E-02 | -2.597801E-01 | -8.573688E-02 | | |
| a10 | 2.768793E-02 | -1.101709E-01 | 1.277787E-01 | 3.377590E-02 | | |
| a12 | -1.244309E-01 | 1.060854E-01 | -4.439472E-02 | -9.137020E-03 | | |
| a14 | 1.470390E-01 | -6.117208E-02 | 1.026509E-02 | 1.653600E-03 | | |
| a16 | -9.238263E-02 | 1.981511E-02 | -1.497593E-03 | -1.902667E-04 | | |
| a18 | 3.022658E-02 | -3.341688E-03 | 1.248625E-04 | 1.255138E-05 | | |
| a20 | -3.983280E-03 | 2.287319E-04 | -4.543859E-06 | -3.611888E-07 | | |

FIG.23

| Second Example ||||||||
|---|---|---|---|---|---|---|
| EFL(Effective Focal Length)=3.763 mm, HFOV(Half Field Of View)= 37.352 deg., Total length=4.566mm, Fno=2.2 ||||||||
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.281 | | | | |
| 11 | First Lens | 1.432 | 0.565 | 1.546 | 56.114 | Plastic | 2.757 |
| 12 | | 25.461 | 0.093 | | | | |
| 21 | Second Lens | -7.151 | 0.200 | 1.648 | 22.397 | Plastic | -5.756 |
| 22 | | 7.880 | 0.326 | | | | |
| 31 | Third Lens | -12.675 | 0.262 | 1.648 | 22.397 | Plastic | -64.465 |
| 32 | | -18.345 | 0.464 | | | | |
| 41 | Fourth Lens | -9.516 | 0.813 | 1.546 | 56.114 | Plastic | 3.326 |
| 42 | | -1.571 | 0.321 | | | | |
| 51 | Fifth Lens | 2.906 | 0.415 | 1.546 | 56.114 | Plastic | -2.806 |
| 52 | | 0.952 | 0.450 | | | | |
| 72 | Filter | INFINITY | 0.210 | | | | |
| | | INFINITY | 0.444 | | | | |
| 71 | Image Plane | INFINITY | 0.004 | | | | |

FIG.24

| Second Example | | | | | |
|---|---|---|---|---|---|
| Aspheric coefficients | | | | | |
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | -2.646336E-04 | -5.158665E-02 | -5.009149E-02 | -3.410967E-02 | -3.015612E-01 | -2.108996E-01 |
| a6 | 4.680147E-02 | 2.997834E-02 | 2.747771E-01 | 2.641876E-01 | 2.355388E-01 | 1.853684E-01 |
| a8 | -1.404838E-01 | 4.005150E-01 | -1.111664E-01 | -4.197908E-01 | -1.441139E+00 | -8.954024E-01 |
| a10 | 2.164501E-01 | -1.350159E+00 | -7.384557E-01 | 2.291650E-01 | 4.627814E+00 | 2.940223E+00 |
| a12 | -1.319328E-01 | 1.744631E+00 | 1.348045E+00 | -3.817607E-02 | -8.757504E+00 | -5.590889E+00 |
| a14 | 0.000000E+00 | -8.662073E-01 | -7.164274E-01 | 0.000000E+00 | 8.354708E+00 | 6.205947E+00 |
| a16 | 0.000000E+00 | 0.000000E+00 | 0.000000E+00 | 0.000000E+00 | -2.982036E+00 | -3.628196E+00 |
| a18 | 0.000000E+00 | 0.000000E+00 | 0.000000E+00 | 0.000000E+00 | 0.000000E+00 | 9.042989E-01 |
| a20 | 0.000000E+00 | 0.000000E+00 | 0.000000E+00 | 0.000000E+00 | 0.000000E+00 | 0.000000E+00 |
| Surface # | 41 | 42 | 51 | 5 | | |
| K | 0.000000E+00 | -9.456193E-01 | 0.000000E+00 | -4.462157E+00 | | |
| a4 | 8.927267E-03 | 4.087400E-02 | -4.661213E-01 | -1.898653E-01 | | |
| a6 | -7.920243E-02 | -2.733854E-02 | 3.861625E-01 | 1.478201E-01 | | |
| a8 | 1.254148E-01 | 6.654814E-02 | -2.317263E-01 | -8.094882E-02 | | |
| a10 | -1.287872E-01 | -8.344636E-02 | 1.076044E-01 | 3.073086E-02 | | |
| a12 | 9.370527E-02 | 7.823556E-02 | -3.606052E-02 | -7.996684E-03 | | |
| a14 | -4.567293E-02 | -4.647389E-02 | 8.188121E-03 | 1.390479E-03 | | |
| a16 | 1.117306E-02 | 1.574096E-02 | -1.186954E-03 | -1.535763E-04 | | |
| a18 | -2.124603E-04 | -2.793082E-03 | 9.905696E-05 | 9.725701E-06 | | |
| a20 | -2.606031E-04 | 2.023554E-04 | -3.625461E-06 | -2.692224E-07 | | |

FIG.25

| Third Example ||||||||
|---|---|---|---|---|---|---|
| EFL(Effective Focal Length)=3.778 mm, HFOV(Half Field Of View)= 37.251 deg., Total length=4.526mm, Fno=2.2 ||||||||
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.285 | | | | |
| 11 | First Lens | 1.424 | 0.557 | 1.546 | 56.114 | Plastic | 2.737 |
| 12 | | 26.028 | 0.081 | | | | |
| 21 | Second Lens | -7.659 | 0.246 | 1.648 | 22.397 | Plastic | -5.619 |
| 22 | | 7.027 | 0.296 | | | | |
| 31 | Third Lens | -32.794 | 0.265 | 1.648 | 22.397 | Plastic | -72.286 |
| 32 | | -109.739 | 0.501 | | | | |
| 41 | Fourth Lens | -11.510 | 0.768 | 1.546 | 56.114 | Plastic | 3.368 |
| 42 | | -1.623 | 0.342 | | | | |
| 51 | Fifth Lens | 2.897 | 0.384 | 1.546 | 56.114 | Plastic | -2.745 |
| 52 | | 0.941 | 0.450 | | | | |
| 72 | Filter | INFINITY | 0.210 | | | | |
| | | INFINITY | 0.423 | | | | |
| 71 | Image Plane | INFINITY | 0.003 | | | | |

FIG.26

| Third Example ||||||
|---|---|---|---|---|---|
| Aspheric coefficients ||||||
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | -1.623335E-03 | -5.354594E-02 | -4.715627E-02 | -3.160734E-02 | -2.918254E-01 | -2.058646E-01 |
| a6 | 5.295647E-02 | 4.006828E-02 | 2.531514E-01 | 2.346239E-01 | 1.712225E-01 | 1.556166E-01 |
| a8 | -1.604231E-01 | 3.595775E-01 | -1.372927E-01 | -3.573092E-01 | -1.002185E+00 | -7.575699E-01 |
| a10 | 2.455565E-01 | -1.195995E+00 | -4.671915E-01 | 2.095150E-01 | 3.144336E+00 | 2.549245E+00 |
| a12 | -1.482196E-01 | 1.493385E+00 | 8.710122E-01 | -6.525615E-02 | -5.929270E+00 | -4.963402E+00 |
| a14 | 0.000000E+00 | -7.324711E-01 | -4.600433E-01 | 0.000000E+00 | 5.604170E+00 | 5.687332E+00 |
| a16 | 0.000000E+00 | 0.000000E+00 | 0.000000E+00 | 0.000000E+00 | -1.970352E+00 | -3.466854E+00 |
| a18 | 0.000000E+00 | 0.000000E+00 | 0.000000E+00 | 0.000000E+00 | 0.000000E+00 | 9.112024E-01 |
| a20 | 0.000000E+00 | 0.000000E+00 | 0.000000E+00 | 0.000000E+00 | 0.000000E+00 | 0.000000E+00 |
| Surface # | 41 | 42 | 51 | 52 | | |
| K | 0.000000E+00 | -9.008200E-01 | 0.000000E+00 | -4.830585E+00 | | |
| a4 | 5.767931E-03 | 4.239643E-02 | -5.280408E-01 | -2.009412E-01 | | |
| a6 | -6.951843E-02 | -3.563970E-02 | 4.858281E-01 | 1.623978E-01 | | |
| a8 | 7.546434E-02 | 9.509657E-02 | -3.323468E-01 | -9.148401E-02 | | |
| a10 | -2.614064E-02 | -1.389519E-01 | 1.755215E-01 | 3.547331E-02 | | |
| a12 | -4.275371E-02 | 1.382139E-01 | -6.583731E-02 | -9.375556E-03 | | |
| a14 | 7.212365E-02 | -8.336576E-02 | 1.649297E-02 | 1.651943E-03 | | |
| a16 | -5.106284E-02 | 2.861262E-02 | -2.609373E-03 | -1.851273E-04 | | |
| a18 | 1.774654E-02 | -5.173023E-03 | 2.357142E-04 | 1.193512E-05 | | |
| a20 | -2.401646E-03 | 3.838770E-04 | -9.275866E-06 | -3.376906E-07 | | |

FIG.27

| Fourth Example | | | | | | |
|---|---|---|---|---|---|---|
| EFL(Effective Focal Length)=3.673 mm, HFOV(Half Field Of View)= 38.023 deg., Total length=4.382mm, Fno=2.2 | | | | | | |
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.272 | | | | |
| 11 | First Lens | 1.409 | 0.522 | 1.546 | 56.114 | Plastic | 2.703 |
| 12 | | 22.342 | 0.079 | | | | |
| 21 | Second Lens | -8.075 | 0.200 | 1.648 | 22.397 | Plastic | -5.554 |
| 22 | | 6.554 | 0.304 | | | | |
| 31 | Third Lens | -13.226 | 0.301 | 1.648 | 22.397 | Plastic | -47.409 |
| 32 | | -23.434 | 0.547 | | | | |
| 41 | Fourth Lens | -9.240 | 0.508 | 1.546 | 56.114 | Plastic | 3.494 |
| 42 | | -1.612 | 0.454 | | | | |
| 51 | Fifth Lens | 2.849 | 0.389 | 1.546 | 56.114 | Plastic | -3.003 |
| 52 | | 0.990 | 0.450 | | | | |
| 72 | Filter | INFINITY | 0.210 | | | | |
| | | INFINITY | 0.414 | | | | |
| 71 | Image Plane | INFINITY | 0.004 | | | | |

FIG.28

| Fourth Example | | | | | |
|---|---|---|---|---|---|
| Aspheric coefficients | | | | | |
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | -7.953947E-04 | -5.798701E-02 | -5.749957E-02 | -3.496692E-02 | -2.828182E-01 | -1.906796E-01 |
| a6 | 6.292566E-02 | 2.939292E-02 | 3.175642E-01 | 2.853506E-01 | 1.572371E-01 | 1.402070E-01 |
| a8 | -1.966752E-01 | 5.376842E-01 | -1.844932E-01 | -4.884298E-01 | -1.148561E+00 | -8.032924E-01 |
| a10 | 3.164903E-01 | -1.797578E+00 | -6.971971E-01 | 3.233842E-01 | 3.834774E+00 | 2.790387E+00 |
| a12 | -1.983612E-01 | 2.374587E+00 | 1.411184E+00 | -9.170750E-02 | -7.652444E+00 | -5.572024E+00 |
| a14 | 0.000000E+00 | -1.225565E+00 | -8.030936E-01 | 0.000000E+00 | 7.685528E+00 | 6.537479E+00 |
| a16 | 0.000000E+00 | 0.000000E+00 | 0.000000E+00 | 0.000000E+00 | -2.870777E+00 | -4.076799E+00 |
| a18 | 0.000000E+00 | 0.000000E+00 | 0.000000E+00 | 0.000000E+00 | 0.000000E+00 | 1.089897E+00 |
| a20 | 0.000000E+00 | 0.000000E+00 | 0.000000E+00 | 0.000000E+00 | 0.000000E+00 | 0.000000E+00 |
| Surface # | 41 | 42 | 51 | 52 | | |
| K | 0.000000E+00 | -8.706920E-01 | 0.000000E+00 | -4.568190E+00 | | |
| a4 | 1.439969E-02 | 5.139022E-02 | -4.674042E-01 | -2.021960E-01 | | |
| a6 | -6.163166E-02 | -6.379023E-02 | 3.680264E-01 | 1.581740E-01 | | |
| a8 | 2.194013E-02 | 1.599183E-01 | -2.060368E-01 | -8.791795E-02 | | |
| a10 | 8.125516E-02 | -2.456954E-01 | 9.256685E-02 | 3.441706E-02 | | |
| a12 | -1.519119E-01 | 2.725196E-01 | -3.142304E-02 | -9.334444E-03 | | |
| a14 | 1.355729E-01 | -1.859567E-01 | 7.416065E-03 | 1.703171E-03 | | |
| a16 | -7.082334E-02 | 7.221203E-02 | -1.129267E-03 | -1.983005E-04 | | |
| a18 | 2.007776E-02 | -1.476038E-02 | 9.932365E-05 | 1.326634E-05 | | |
| a20 | -2.330271E-03 | 1.239326E-03 | -3.832018E-06 | -3.876916E-07 | | |

FIG.29

| Fifth Example | | | | | | |
|---|---|---|---|---|---|---|
| EFL(Effective Focal Length)=3.661 mm, HFOV(Half Field Of View)= 38.097 deg., Total length=4.392mm, Fno=2.2 | | | | | | |
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.270 | | | | |
| 11 | First Lens | 1.409 | 0.501 | 1.546 | 56.114 | Plastic | 2.741 |
| 12 | | 21.155 | 0.083 | | | | |
| 21 | Second Lens | -8.044 | 0.200 | 1.648 | 22.397 | Plastic | -5.559 |
| 22 | | 6.586 | 0.305 | | | | |
| 31 | Third Lens | -13.811 | 0.304 | 1.648 | 22.397 | Plastic | -50.524 |
| 32 | | -24.097 | 0.552 | | | | |
| 41 | Fourth Lens | -9.416 | 0.517 | 1.546 | 56.114 | Plastic | 3.474 |
| 42 | | -1.609 | 0.456 | | | | |
| 51 | Fifth Lens | 2.853 | 0.391 | 1.546 | 56.114 | Plastic | -3.027 |
| 52 | | 0.996 | 0.450 | | | | |
| 72 | Filter | INFINITY | 0.210 | | | | |
| | | INFINITY | 0.418 | | | | |
| 71 | Image Plane | INFINITY | 0.007 | | | | |

FIG.30

| Fifth Example |||||||
|---|---|---|---|---|---|---|
| Aspheric coefficients |||||||
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | -8.247539E-04 | -5.756050E-02 | -5.917643E-02 | -3.615468E-02 | -2.840862E-01 | -1.895496E-01 |
| a6 | 6.746991E-02 | 3.508186E-02 | 3.379704E-01 | 2.899315E-01 | 1.871430E-01 | 1.393578E-01 |
| a8 | -2.131404E-01 | 4.847436E-01 | -3.058088E-01 | -5.018351E-01 | -1.296807E+00 | -7.803448E-01 |
| a10 | 3.471865E-01 | -1.643402E+00 | -3.702745E-01 | 3.453306E-01 | 4.263501E+00 | 2.679918E+00 |
| a12 | -2.193827E-01 | 2.182279E+00 | 9.982136E-01 | -1.055264E-01 | -8.388147E+00 | -5.327173E+00 |
| a14 | 0.000000E+00 | -1.135221E+00 | -6.019634E-01 | 0.000000E+00 | 8.371491E+00 | 6.242503E+00 |
| a16 | 0.000000E+00 | 0.000000E+00 | 0.000000E+00 | 0.000000E+00 | -3.139275E+00 | -3.895217E+00 |
| a18 | 0.000000E+00 | 0.000000E+00 | 0.000000E+00 | 0.000000E+00 | 0.000000E+00 | 1.045033E+00 |
| a20 | 0.000000E+00 | 0.000000E+00 | 0.000000E+00 | 0.000000E+00 | 0.000000E+00 | 0.000000E+00 |
| Surface # | 41 | 42 | 51 | 52 | | |
| K | 0.000000E+00 | -8.635428E-01 | 0.000000E+00 | -4.436895E+00 | | |
| a4 | 1.146008E-02 | 4.966433E-02 | -4.547789E-01 | -2.022570E-01 | | |
| a6 | -5.666336E-02 | -6.035333E-02 | 3.501181E-01 | 1.588158E-01 | | |
| a8 | 1.708868E-02 | 1.519864E-01 | -1.894821E-01 | -8.871425E-02 | | |
| a10 | 8.855640E-02 | -2.299386E-01 | 8.212586E-02 | 3.497689E-02 | | |
| a12 | -1.631593E-01 | 2.531282E-01 | -2.709957E-02 | -9.566284E-03 | | |
| a14 | 1.459531E-01 | -1.721762E-01 | 6.269815E-03 | 1.760553E-03 | | |
| a16 | -7.618846E-02 | 6.665933E-02 | -9.421127E-04 | -2.066087E-04 | | |
| a18 | 2.153736E-02 | -1.357901E-02 | 8.217487E-05 | 1.391235E-05 | | |
| a20 | -2.493842E-03 | 1.136136E-03 | -3.156378E-06 | -4.084120E-07 | | |

FIG.31

| | Sixth Example | | | | | |
|---|---|---|---|---|---|---|
| | EFL(Effective Focal Length)=3.677 mm, HFOV(Half Field Of View)= 38.029 deg., Total length=4.434mm, Fno=2.2 | | | | | |
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.273 | | | | |
| 11 | First Lens | 1.402 | 0.554 | 1.546 | 56.114 | Plastic | 2.683 |
| 12 | | 28.141 | 0.079 | | | | |
| 21 | Second Lens | -7.448 | 0.211 | 1.648 | 22.397 | Plastic | -5.507 |
| 22 | | 6.926 | 0.287 | | | | |
| 31 | Third Lens | -28.620 | 0.270 | 1.648 | 22.397 | Plastic | -78.773 |
| 32 | | -65.401 | 0.453 | | | | |
| 41 | Fourth Lens | -9.707 | 0.763 | 1.546 | 56.114 | Plastic | 3.351 |
| 42 | | -1.582 | 0.314 | | | | |
| 51 | Fifth Lens | 2.847 | 0.413 | 1.546 | 56.114 | Plastic | -2.787 |
| 52 | | 0.941 | 0.450 | | | | |
| 72 | Filter | INFINITY | 0.210 | | | | |
| | | INFINITY | 0.431 | | | | |
| 71 | Image Plane | INFINITY | -0.001 | | | | |

FIG.32

| | Sixth Example | | | | | |
|---|---|---|---|---|---|---|
| | Aspheric coefficients | | | | | |
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | -1.160675E-03 | -6.500938E-02 | -6.525268E-02 | -4.630059E-02 | -2.895269E-01 | -1.969177E-01 |
| a6 | 5.678835E-02 | 8.466519E-02 | 3.797258E-01 | 3.353881E-01 | 8.061926E-02 | 1.205285E-01 |
| a8 | -1.827106E-01 | 3.481815E-01 | -3.694522E-01 | -5.894678E-01 | -5.538126E-01 | -7.305787E-01 |
| a10 | 2.953024E-01 | -1.448914E+00 | -3.766446E-01 | 4.669312E-01 | 1.919270E+00 | 2.866193E+00 |
| a12 | -1.885597E-01 | 2.015735E+00 | 1.092893E+00 | -1.879604E-01 | -4.078309E+00 | -6.181078E+00 |
| a14 | 0.000000E+00 | -1.080784E+00 | -6.788039E-01 | 0.000000E+00 | 4.160616E+00 | 7.685750E+00 |
| a16 | 0.000000E+00 | 0.000000E+00 | 0.000000E+00 | 0.000000E+00 | -1.518124E+00 | -5.045385E+00 |
| a18 | 0.000000E+00 | 0.000000E+00 | 0.000000E+00 | 0.000000E+00 | 0.000000E+00 | 1.410630E+00 |
| a20 | 0.000000E+00 | 0.000000E+00 | 0.000000E+00 | 0.000000E+00 | 0.000000E+00 | 0.000000E+00 |
| Surface # | 41 | 42 | 51 | 52 | | |
| K | 0.000000E+00 | -9.895911E-01 | 0.000000E+00 | -4.608801E+00 | | |
| a4 | 2.223181E-02 | 4.629781E-02 | -4.986476E-01 | -1.993886E-01 | | |
| a6 | -9.100328E-02 | -3.116611E-02 | 4.258479E-01 | 1.587595E-01 | | |
| a8 | 9.981770E-02 | 7.980661E-02 | -2.722396E-01 | -9.071039E-02 | | |
| a10 | -2.251079E-02 | -1.101911E-01 | 1.376271E-01 | 3.626570E-02 | | |
| a12 | -9.491346E-02 | 1.128135E-01 | -4.986000E-02 | -9.987520E-03 | | |
| a14 | 1.450489E-01 | -7.129994E-02 | 1.204447E-02 | 1.841780E-03 | | |
| a16 | -1.014492E-01 | 2.529561E-02 | -1.831087E-03 | -2.157876E-04 | | |
| a18 | 3.542865E-02 | -4.658892E-03 | 1.585415E-04 | 1.447891E-05 | | |
| a20 | -4.874482E-03 | 3.482235E-04 | -5.972445E-06 | -4.235402E-07 | | |

FIG.33

| Seventh Example |||||||
|---|---|---|---|---|---|---|
| EFL(Effective Focal Length)=3.985 mm, HFOV(Half Field Of View)= 35.805 deg., Total length=4.715mm, Fno=2.2 |||||||
| No. | | Curvature Radius | Thickness/ air gap | Refractive Index | Abbe No. | Material | Focal Length |
| | Object | INFINITY | INFINITY | | | | |
| 80 | Ape. Stop | INFINITY | -0.300 | | | | |
| 11 | First Lens | 1.498 | 0.715 | 1.546 | 56.114 | Plastic | 2.784 |
| 12 | | 88.522 | 0.074 | | | | |
| 21 | Second Lens | -7.865 | 0.200 | 1.648 | 22.397 | Plastic | -5.342 |
| 22 | | 6.243 | 0.327 | | | | |
| 31 | Third Lens | -23.632 | 0.316 | 1.648 | 22.397 | Plastic | -168.901 |
| 32 | | -30.299 | 0.503 | | | | |
| 41 | Fourth Lens | -10.906 | 0.766 | 1.546 | 56.114 | Plastic | 3.411 |
| 42 | | -1.630 | 0.328 | | | | |
| 51 | Fifth Lens | 2.963 | 0.363 | 1.546 | 56.114 | Plastic | -2.718 |
| 52 | | 0.946 | 0.450 | | | | |
| 72 | Filter | INFINITY | 0.210 | | | | |
| | | INFINITY | 0.464 | | | | |
| 71 | Image Plane | INFINITY | 0.000 | | | | |

FIG.34

| Seventh Example | | | | | | |
|---|---|---|---|---|---|---|
| Aspheric coefficients | | | | | | |
| Surface # | 11 | 12 | 21 | 22 | 31 | 32 |
| K | 0.000000E+00 | 0.000000E+00 | 0.000000E+00 | 0.000000E+00 | 0.000000E+00 | 0.000000E+00 |
| a4 | -1.262857E-03 | -6.459109E-02 | -7.061216E-02 | -4.793199E-02 | -2.537073E-01 | -1.764562E-01 |
| a6 | 2.700401E-02 | 1.210258E-01 | 3.703603E-01 | 3.173878E-01 | 1.819397E-01 | 1.098972E-01 |
| a8 | -7.191191E-02 | 1.394943E-01 | -3.751062E-01 | -5.639933E-01 | -9.604499E-01 | -4.447358E-01 |
| a10 | 9.579060E-02 | -8.443344E-01 | -2.809247E-01 | 4.691005E-01 | 2.757034E+00 | 1.263653E+00 |
| a12 | -5.160141E-02 | 1.139306E+00 | 8.613053E-01 | -1.631130E-01 | -4.766148E+00 | -2.105353E+00 |
| a14 | 0.000000E+00 | -5.496613E-01 | -4.973630E-01 | 0.000000E+00 | 4.195761E+00 | 2.072703E+00 |
| a16 | 0.000000E+00 | 0.000000E+00 | 0.000000E+00 | 0.000000E+00 | -1.401186E+00 | -1.077028E+00 |
| a18 | 0.000000E+00 | 0.000000E+00 | 0.000000E+00 | 0.000000E+00 | 0.000000E+00 | 2.434507E-01 |
| a20 | 0.000000E+00 | 0.000000E+00 | 0.000000E+00 | 0.000000E+00 | 0.000000E+00 | 0.000000E+00 |
| Surface # | 41 | 42 | 51 | 52 | | |
| K | 0.000000E+00 | -9.257190E-01 | 0.000000E+00 | -4.989551E+00 | | |
| a4 | 5.282059E-03 | 5.552671E-02 | -5.339694E-01 | -2.106335E-01 | | |
| a6 | -9.183334E-02 | -6.247954E-02 | 5.044538E-01 | 1.769755E-01 | | |
| a8 | 1.524211E-01 | 1.243252E-01 | -3.451717E-01 | -1.032381E-01 | | |
| a10 | -1.778342E-01 | -1.502375E-01 | 1.772246E-01 | 4.138236E-02 | | |
| a12 | 1.420367E-01 | 1.256041E-01 | -6.414687E-02 | -1.132568E-02 | | |
| a14 | -7.090313E-02 | -6.679595E-02 | 1.556932E-02 | 2.071658E-03 | | |
| a16 | 1.834495E-02 | 2.091582E-02 | -2.403372E-03 | -2.415530E-04 | | |
| a18 | -1.360734E-03 | -3.513212E-03 | 2.133244E-04 | 1.621678E-05 | | |
| a20 | -1.606552E-04 | 2.444932E-04 | -8.300639E-06 | -4.771944E-07 | | |

FIG.35

|  | Example 1 | Example 2 | Example 3 | Example 4 | Example 5 | Example 6 | Example 7 |
|---|---|---|---|---|---|---|---|
| T1 | 0.567 | 0.565 | 0.557 | 0.522 | 0.501 | 0.554 | 0.715 |
| AG12 | 0.081 | 0.093 | 0.081 | 0.079 | 0.083 | 0.079 | 0.074 |
| T2 | 0.200 | 0.200 | 0.246 | 0.200 | 0.200 | 0.211 | 0.200 |
| AG23 | 0.309 | 0.326 | 0.296 | 0.304 | 0.305 | 0.287 | 0.327 |
| T3 | 0.254 | 0.262 | 0.265 | 0.301 | 0.304 | 0.270 | 0.316 |
| AG34 | 0.448 | 0.464 | 0.501 | 0.547 | 0.552 | 0.453 | 0.503 |
| T4 | 0.825 | 0.813 | 0.768 | 0.508 | 0.517 | 0.763 | 0.766 |
| AG45 | 0.331 | 0.321 | 0.342 | 0.454 | 0.456 | 0.314 | 0.328 |
| T5 | 0.416 | 0.415 | 0.384 | 0.389 | 0.391 | 0.413 | 0.363 |
| BFL | 1.104 | 1.108 | 1.086 | 1.078 | 1.085 | 1.090 | 1.124 |
| EFL | 3.738 | 3.763 | 3.778 | 3.673 | 3.661 | 3.677 | 3.985 |
| ALT | 2.262 | 2.255 | 2.220 | 1.920 | 1.912 | 2.212 | 2.360 |
| AAG | 1.169 | 1.203 | 1.219 | 1.384 | 1.395 | 1.133 | 1.232 |
| \|V1-V3\| | 33.717 | 33.717 | 33.717 | 33.717 | 33.717 | 33.717 | 33.717 |
| EFL/(G34+G45) | 4.798 | 4.798 | 4.485 | 3.670 | 3.632 | 4.791 | 4.798 |
| AAG/T3 | 4.597 | 4.597 | 4.597 | 4.597 | 4.597 | 4.200 | 3.900 |
| G34/G45 | 1.355 | 1.447 | 1.464 | 1.203 | 1.212 | 1.441 | 1.534 |
| (G12+G23)/T2 | 1.949 | 2.092 | 1.532 | 1.914 | 1.938 | 1.728 | 2.005 |
| AAG/G34 | 2.607 | 2.593 | 2.436 | 2.531 | 2.527 | 2.499 | 2.449 |
| (T1+T3)/T2 | 4.106 | 4.135 | 3.340 | 4.116 | 4.020 | 3.900 | 5.154 |
| EFL/T4 | 4.531 | 4.627 | 4.917 | 7.232 | 7.082 | 4.819 | 5.202 |
| (G23+G45)/T4 | 0.775 | 0.795 | 0.830 | 1.492 | 1.471 | 0.787 | 0.855 |
| ALT/(T2+T5) | 3.674 | 3.666 | 3.523 | 3.259 | 3.237 | 3.540 | 4.193 |
| (T1+T5)/G23 | 3.183 | 3.011 | 3.180 | 3.003 | 2.926 | 3.378 | 3.292 |
| ALT/T1 | 3.990 | 3.990 | 3.990 | 3.677 | 3.819 | 3.990 | 3.300 |
| (T4+T5)/G23 | 4.020 | 3.772 | 3.896 | 2.956 | 2.980 | 4.106 | 3.448 |
| AAG/(T1+T2) | 1.524 | 1.572 | 1.520 | 1.916 | 1.992 | 1.479 | 1.346 |
| T5/G23 | 1.347 | 1.275 | 1.299 | 1.283 | 1.282 | 1.443 | 1.108 |

FIG.36

OPTICAL IMAGING LENS AND ELECTRONIC DEVICE COMPRISING THE SAME

CROSS REFERENCE TO RELATED APPLICATION

This application claims priority from Taiwan patent Application No. 104110085, filed on Mar. 27, 2015, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of five lens elements and an electronic device which includes such optical imaging lens set.

2. Description of the Prior Art

In recent years, the popularity of mobile phones and digital cameras makes photography modules (including optical imaging lens set, holder and sensor, etc) well developed. Mobile phones and digital cameras become lighter and thinner, so that the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality.

To an optical imaging lens set with five lens elements, the distance between the first object size surface to the image plane is too large to satisfy the specification requirements of consumer electronics products.

Therefore, how to reduce the total length of a photographic device, but still maintain good optical performance, is an important research objective.

SUMMARY OF THE INVENTION

In the light of the above, the present invention is capable of proposing an optical imaging lens set that is lightweight, and has a low production cost, reduced length, high resolution and high image quality. The optical imaging lens set of five lens elements of the present invention has an aperture, a first lens element, a second lens element, a third lens element, a fourth lens element and a fifth lens element sequentially from an object side to an image side along an optical axis.

An optical imaging lens includes: an aperture, a first, second, third, fourth and fifth lens element, each lens element in the optical imaging lens set of the present invention has an object-side surface facing toward the object side as well as an image-side surface facing toward the image side, wherein the first lens element has positive refracting power; the second lens element has an image-side surface with a concave part in a vicinity of its periphery; the third lens element has an object-side surface with a concave part in a vicinity of its periphery; the fourth lens has positive refracting power and has an object-side surface with a concave part in a vicinity of the optical axis, and a concave part in a vicinity of its periphery; the fourth lens further has an image-side surface with a convex part in a vicinity of its periphery; the fifth lens element has negative refracting power and has an object-side surface with a convex part in a vicinity of the optical axis, the fifth lens element further has image-side surface with a concave part in a vicinity of the optical axis and a convex part in a vicinity of its periphery, wherein the optical imaging lens set does not include any lens element with refractive power other than said first, second, third, fourth, and fifth lens elements.

In the optical imaging lens set of six lens elements of the present invention, an air gap G12 along the optical axis is disposed between the first lens element and the second lens element, an air gap G23 along the optical axis is disposed between the second lens element and the third lens element, an air gap G34 along the optical axis is disposed between the third lens element and the fourth lens element, an air gap G45 along the optical axis is disposed between the fourth lens element and the fifth lens element, and the sum of total four air gaps between adjacent lens elements from the first lens element to the sixth lens element along the optical axis is AAG, AAG=G12+G23+G34+G45.

In the optical imaging lens set of six lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, and the total thickness of all the lens elements in the optical imaging lens set along the optical axis is ALT, ALT=T1+T2+T3+T4+T5.

In addition, the distance between the first object-side surface of the first lens element to the image plane is TTL. The distance between the image-side surface of the fifth lens element to an image plane along the optical axis is BFL (back focal length); the effective focal length of the optical imaging lens set is EFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the Abbe number of the first lens element 10 is V1; the Abbe number of the second lens element 20 is V2; the Abbe number of the third lens element 30 is V3; the Abbe number of the fourth lens element 40 is V4; and the Abbe number of the fifth lens element 50 is V5.

In the optical imaging lens set of five lens elements of the present invention, the relationship $|V1-V3| \geq 20$ is satisfied.

In the optical imaging lens set of five lens elements of the present invention, the relationship $EFL/(G34+G45) \leq 4.8$ is satisfied.

In the optical imaging lens set of five lens elements of the present invention, the relationship $AAG/T3 \leq 4.6$ is satisfied.

In the optical imaging lens set of five lens elements of the present invention, the relationship $G34/G45 \geq 0.9$ is satisfied.

In the optical imaging lens set of five lens elements of the present invention, the relationship $(G12+G23)/T2 \leq 2.1$ is satisfied.

In the optical imaging lens set of five lens elements of the present invention, the relationship $AAG/G34 \leq 3.5$ is satisfied.

In the optical imaging lens set of five lens elements of the present invention, the relationship $(T1+T3)/T2 \geq 3.3$ is satisfied.

In the optical imaging lens set of five lens elements of the present invention, the relationship $EFL/T4 \leq 7.1$ is satisfied.

In the optical imaging lens set of five lens elements of the present invention, the relationship $(G23+G45)/T4 \leq 1.5$ is satisfied.

In the optical imaging lens set of five lens elements of the present invention, the relationship $ALT/(T2+T5) \geq 2.9$ is satisfied.

In the optical imaging lens set of five lens elements of the present invention, the relationship $(T1+T5)/G23 \geq 2.6$ is satisfied.

In the optical imaging lens set of five lens elements of the present invention, the relationship $ALT/T1 \leq 4.0$ is satisfied.

In the optical imaging lens set of five lens elements of the present invention, the relationship $(T4+T5)/G23 \geq 2.7$ is satisfied.

In the optical imaging lens set of five lens elements of the present invention, the relationship $AAG/(T1+T2) \geq 2.0$ is satisfied.

In the optical imaging lens set of five lens elements of the present invention, the relationship $T5/G23 \geq 1.1$ is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region being a region in a vicinity of the optical axis or the region in a vicinity of its circular periphery of one lens element.

FIG. 8 illustrates a second example of the optical imaging lens set of five lens elements of the present invention.

FIG. 9A illustrates the longitudinal spherical aberration on the image plane of the second example.

FIG. 9B illustrates the astigmatic aberration on the sagittal direction of the second example.

FIG. 9C illustrates the astigmatic aberration on the tangential direction of the second example.

FIG. 9D illustrates the distortion aberration of the second example.

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows some important ratios in the examples.

DETAILED DESCRIPTION

Figure 6:
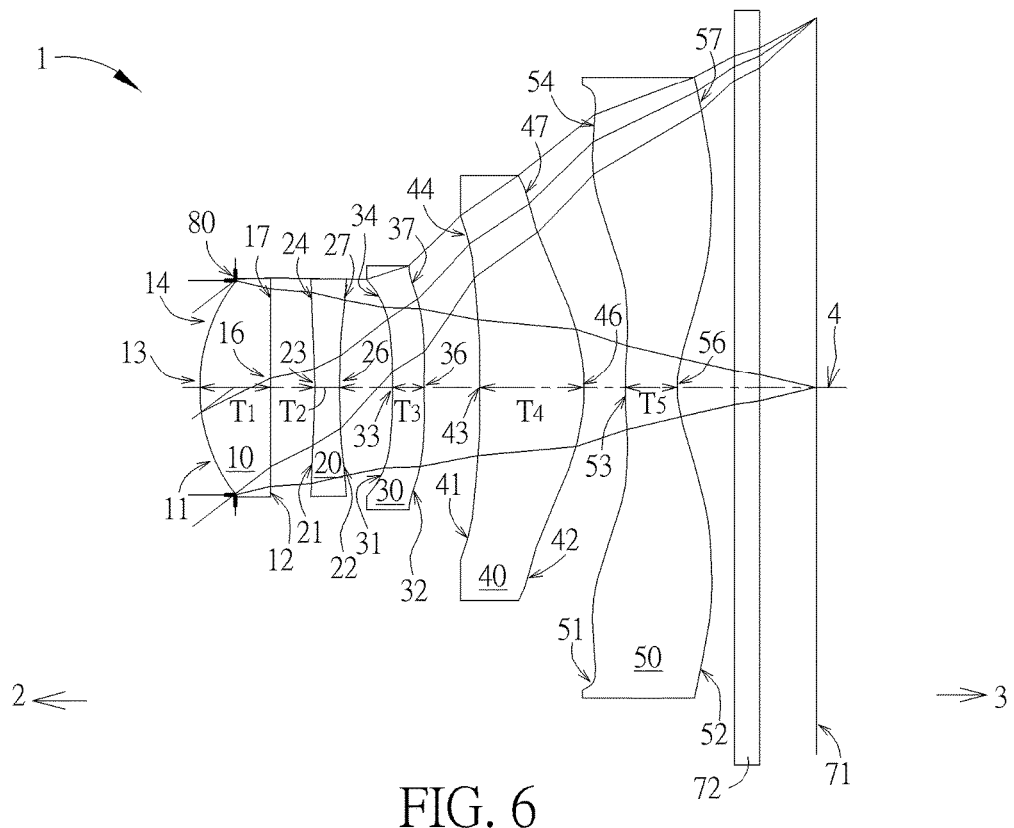
FIG. 6 illustrates a first example of the optical imaging lens set of the present invention.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first: a central point and a transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining if the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), and the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), and that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For zero transition point cases, the portion in a vicinity of the optical axis is defined as the portion between 0-50% of the effective radius (radius of the clear aperture) of the surface, whereas the portion in a vicinity of a periphery of the lens element is defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element being positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0-50% of the effective radius (radius of the clear aperture) is determined as the portion in a vicinity of the optical axis, and the portion between 50-100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of five lens elements of the present invention, sequentially located from an object side 2 (where an object is located) to an image side 3 along an optical axis 4, have an aperture stop 80, a first lens element 10, a second lens element 20, a third lens element 30, a fourth lens element 40, a fifth lens element 50, a filter 72 and an image plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this. There are exclusively five lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50 and the filter 72.

In the embodiments of the present invention, the optional filter 72 may be a filter of various suitable functions, for example, the filter 72 may be an infrared cut filter (IR cut filter), placed between the fifth lens element 50 and the image plane 71. The filter 72 is made of glass.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; and the fifth lens element 50 has a fifth object-side surface 51 and a fifth image-side surface 52.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, and the fifth lens element 50 has a fifth lens element thickness T5. Therefore, the total thickness of all the lens elements in the optical imaging lens set 1 along the optical axis 4 is ALT=T1+T2+T3+T4+T5.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, and an air gap G34 is disposed between the third lens element 30 and the fourth lens element 40, an air gap G45 is disposed between the fourth lens element 40 and the fifth lens element 50. Therefore, the sum of total four air gaps between adjacent lens elements from the first lens element 10 to the fifth lens element 50 along the optical axis 4 is AAG, AAG=G12+G23+G34+G45.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the fifth image-side surface 52 of the fifth lens element 50 to the image plane 71 along the optical axis 4 is BFL; the distance between the fifth image-side surface 52 of the fifth lens element 50 to the filter 72 along the optical axis 4 is G5F; the thickness of the filter 72 along the optical axis 4 is TF; the distance between the filter 72 to the image plane 71 along the optical axis 4 is GFP; Therefore, BFL=G5F+TF+GFP.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the Abbe number of the first lens element 10 is V1; the Abbe number of the second lens element 20 is V2; the Abbe number of the third lens element 30 is V3; the Abbe number of the fourth lens element 40 is V4; and the Abbe number of the fifth lens element 50 is V5.

First Example

Figures 7A, 7B, 7C, 7D:
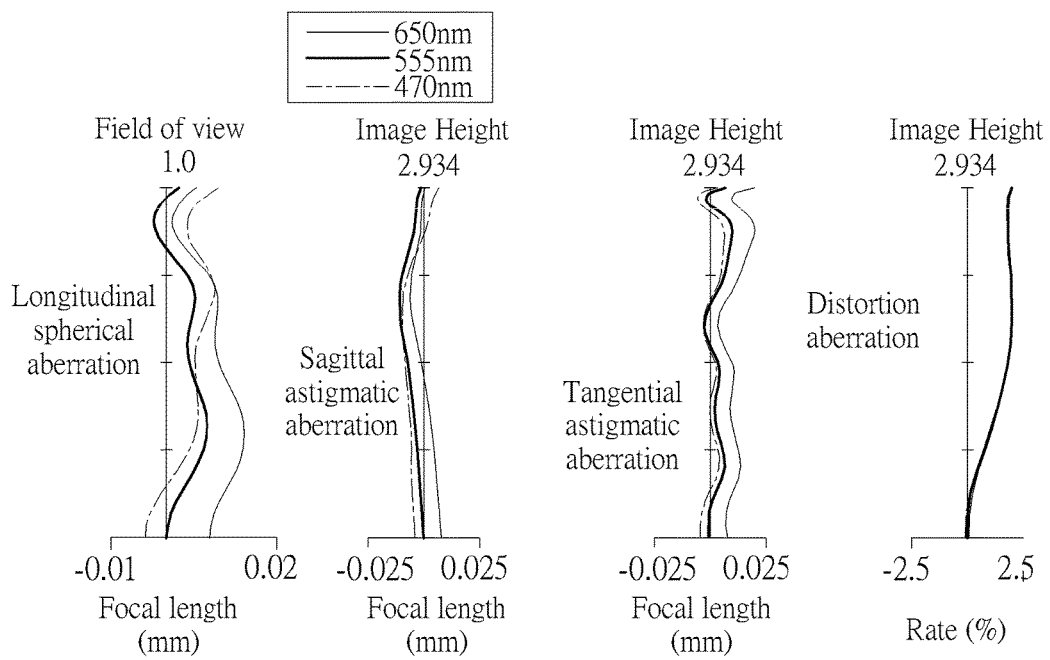
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for image height. The X axis of the spherical aberration and the astigmatic field in each example is the image range. In this example, three curves of different wavelengths (470 nm, 555 nm, 650 nm) in different heights are very close to the imaging point, and the deviation between each off-axis light and the imaging point is ±0.015 mm, so the spherical aberration has been improved significantly. The focal length variation of the astigmatic field aberration on the sagittal direction is within ±0.025 mm; and the focal length variation of the astigmatic field aberration on the tangential direction is within ±0.025 mm; the distortion aberration is within ±2.5%. The image height is 2.934 mm.

The optical imaging lens set 1 of the first example has five lens elements 10 to 50 made of a plastic material and having refractive power. The optical imaging lens set 1 also has an aperture stop 80, a filter 72, and an image plane 71. The aperture stop 80 is provided between the object side 2 and the first lens element 10. The filter 72 may be used for preventing specific wavelength light (such as the infrared light) from reaching the image plane and adversely affecting the imaging quality.

The first lens element 10 has positive refractive power. The first object-side surface 11 facing toward the object side 2 has a convex part 13 in the vicinity of the optical axis and a convex part 14 in a vicinity of its circular periphery. The first image-side surface 12 facing toward the image side 3 has a concave part 16 in the vicinity of the optical axis and a convex part 17 in a vicinity of its circular periphery.

The second lens element 20 has negative refractive power. The second object-side surface 21 facing toward the object side 2 has a concave part 23 in the vicinity of the optical axis and a concave part 24 in a vicinity of its circular periphery. The second image-side surface 22 facing toward the image side 3 has a concave part 26 in the vicinity of the optical axis and a concave part 27 in a vicinity of its circular periphery.

The third lens element 30 has negative refractive power. The third object-side surface 31 facing toward the object side 2 has a concave part 33 in the vicinity of the optical axis and a concave part 34 in a vicinity of its circular periphery. The third image-side surface 32 facing toward the image side 3 has a convex part 36 in the vicinity of the optical axis and a convex part 37 in a vicinity of its circular periphery.

The fourth lens element 40 has positive refractive power. The fourth object-side surface 41 facing toward the object side 2 has a concave part 43 in the vicinity of the optical axis and a concave part 44 in a vicinity of its circular periphery.

The fourth image-side surface 42 facing toward the image side 3 has a convex part 46 in the vicinity of the optical axis and a convex part 47 in a vicinity of its circular periphery.

The fifth lens element 50 has negative refractive power. The fifth object-side surface 51 facing toward the object side 2 has a convex part 53 in the vicinity of the optical axis and a convex part 54 in a vicinity of its circular periphery. The fifth image-side surface 52 facing toward the image side 3 has a concave part 56 in the vicinity of the optical axis and a convex part 57 in a vicinity of its circular periphery. The filter 72 may be disposed between the fifth lens element 50 and the image plane 71.

In the optical imaging lens element 1 of the present invention, the object-side surfaces 11/21/31/41/51 and image-side surfaces 12/22/32/42/52 are all aspherical. These aspheric coefficients are defined according to the following formula:

$$Z(Y) = \frac{Y^2}{R}\left(1 + \sqrt{1-(1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant; and
$a_{2i}$ is the aspheric coefficient of the 2i order.

The optical data of the first example of the optical imaging lens set 1 are shown in FIG. 22 while the aspheric surface data are shown in FIG. 23. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.535 mm. Image height is 2.934 mm, HFOV is 37.548 degrees. Some important ratios of the first example are as follows:

|V1−V3|=33.717

EFL/(G34+G45)=4.798

AAG/T3=4.597

G34/G45=1.355

(G12+G23)/T2=1.949

AAG/G34=2.607

(T1+T3)/T2=4.106

EFL/T4=4.531

(G23+G45)/T4=0.775

ALT/(T2+T5)=3.674

(T1+T5)/G23=3.183

ALT/T1=3.990

$(T4+T5)/G23=4.020$ $AAG/(T1+T2)=1.524$ $T5/G23=1.347$

Second Example

Please refer to FIG. 8 which illustrates the second example of the optical imaging lens set 1 of the present invention. It is noted that from the second example to the following examples, in order to simplify the figures, only the components different from what the first example has and the basic lens elements will be labeled in figures. Other components that are the same as what the first example has, such as the object-side surface, the image-side surface, the part in a vicinity of the optical axis and the part in a vicinity of its circular periphery will be omitted in the following example. Please refer to FIG. 9A for the longitudinal spherical aberration on the image plane 71 of the second example; please refer to FIG. 9B for the astigmatic aberration on the sagittal direction; please refer to FIG. 9C for the astigmatic aberration on the tangential direction, and please refer to FIG. 9D for the distortion aberration. In this example, the deviation of the longitudinal spherical aberration is within ±0.02 mm. The focal length variation of the astigmatic field aberration on the sagittal direction is within ±0.025 mm; the focal length variation of the astigmatic field aberration on the tangential direction is within ±0.025 mm; and the distortion aberration is within ±2.5%. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 24 while the aspheric surface data are shown in FIG. 25. The length of the optical imaging lens set is 4.566 mm. Image height is 2.934 mm, HFOV is 37.352 degrees. Compared with the first example, this example has some advantages such as having shorter total length and having larger HFOV. Some important ratios of the second example are as follows:

$|V1-V3|=33.717$ $EFL/(G34+G45)=4.798$ $AAG/T3=4.597$ $G34/G45=1.447$ $(G12+G23)/T2=2.092$ $AAG/G34=2.593$ $(T1+T3)/T2=4.135$ $EFL/T4=4.627$ $(G23+G45)/T4=0.795$ $ALT/(T2+T5)=3.666$ $(T1+T5)/G23=3.011$ $ALT/T1=3.990$ $(T4+T5)/G23=3.772$ $AAG/(T1+T2)=1.572$ $T5/G23=1.275$

Third Example

Figure 10:
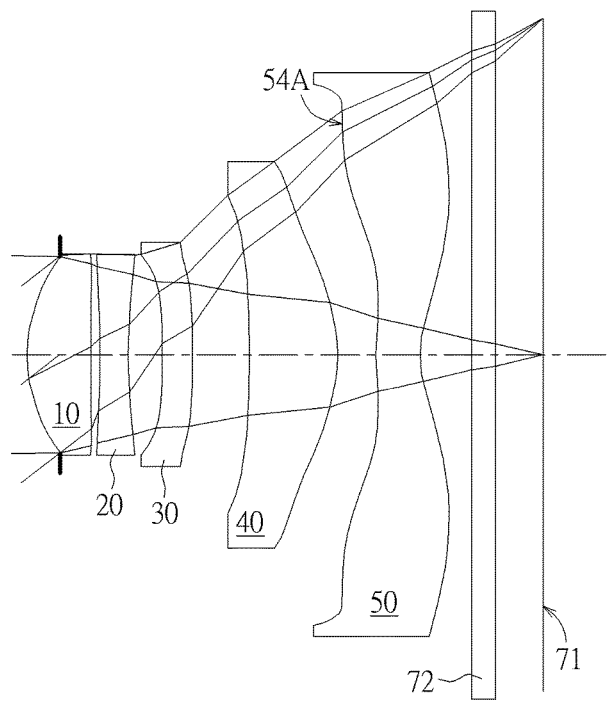
FIG. 10 illustrates a third example of the optical imaging lens set of five lens elements of the present invention.
Figures 11A, 11B, 11C, 11D:
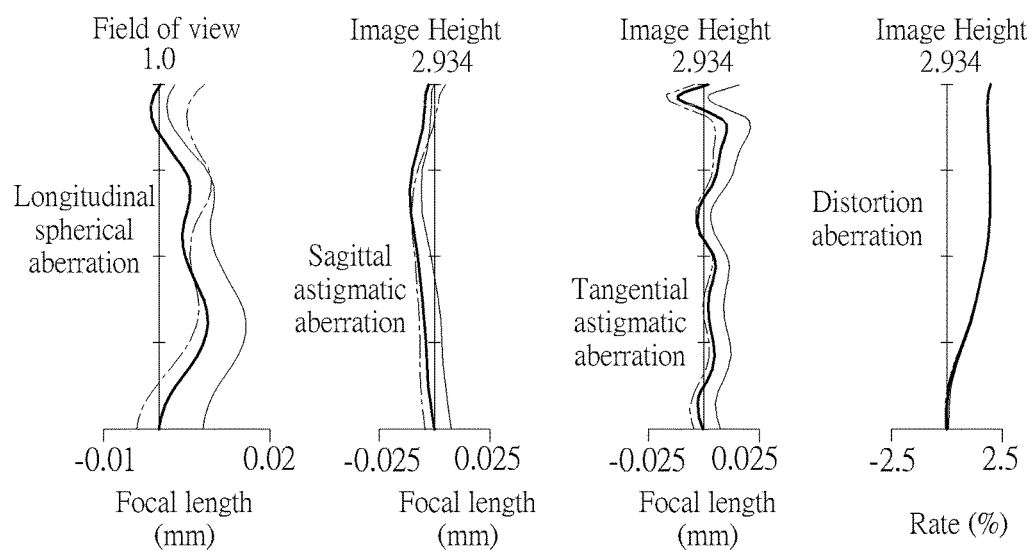
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. In this example, the deviation of the longitudinal spherical aberration is within ±0.02 mm. The focal length variation of the astigmatic field aberration on the sagittal direction is within ±0.025 mm; the focal length variation of the astigmatic field aberration on the tangential direction is within ±0.025 mm; and the distortion aberration is within ±2.5%. The components in the third example are similar to those in the first example, but the optical data such as the curvature radius, the refractive power, the lens thickness, the lens focal length, the aspheric surface or the back focal length in this example are different from the optical data in the first example, and in this example, the fifth object-side surface 51 the fifth lens element 50 has a concave part 54A in a vicinity of its circular periphery. The optical data of the third example of the optical imaging lens set are shown in FIG. 26 while the aspheric surface data are shown in FIG. 27. The length of the optical imaging lens set is 4.526 mm. Image height is 2.934 mm, HFOV is 37.251 degrees. Compared with the first example, this example has some advantages such as having shorter total length. Some important ratios of the third example are as follows:

$|V1-V3|=33.717$ $EFL/(G34+G45)=4.485$ $AAG/T3=4.597$ $G34/G45=1.464$ $(G12+G23)/T2=1.532$ $AAG/G34=2.436$ $(T1+T3)/T2=3.340$ $EFL/T4=4.917$ $(G23+G45)/T4=0.830$ $ALT/(T2+T5)=3.523$ $(T1+T5)/G23=3.180$ $ALT/T1=3.990$ $(T4+T5)/G23=3.896$ $AAG/(T1+T2)=1.520$ $T5/G23=1.299$

Fourth Example

Figure 12:
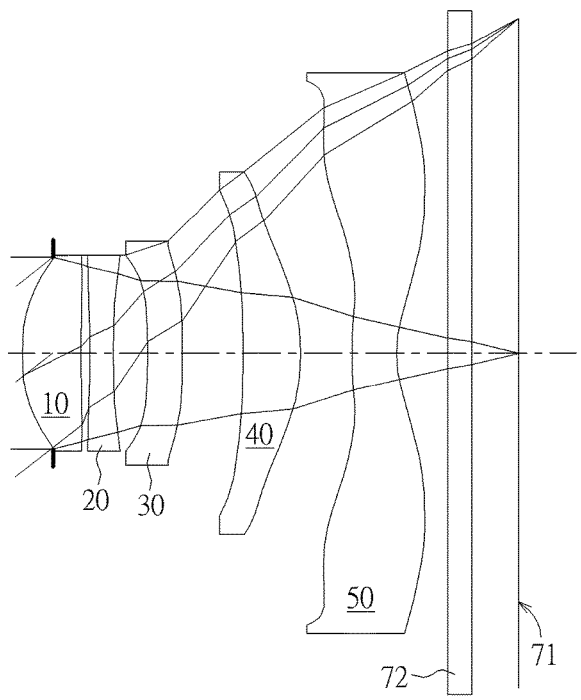
FIG. 12 illustrates a fourth example of the optical imaging lens set of five lens elements of the present invention.
Figures 13A, 13B, 13C, 13D:
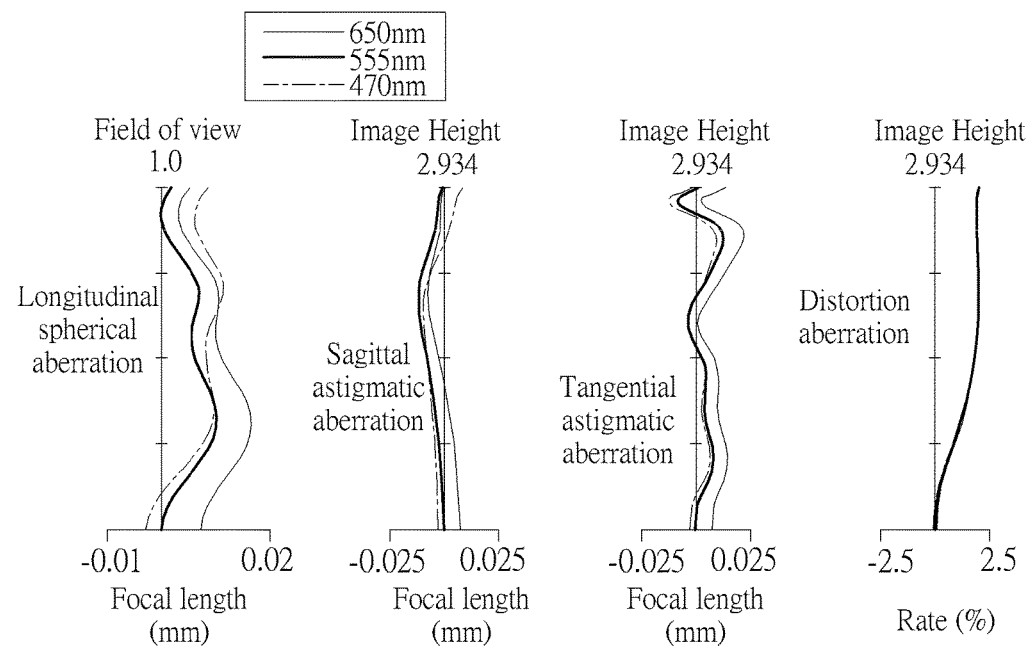
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. In this example, the deviation of the longitudinal spherical aberration is within ±0.02 mm. The focal length variation of the astigmatic field aberration on the sagittal direction is within ±0.025 mm; the focal length variation of the astigmatic field aberration on the tangential direction is within ±0.025 mm; and the distortion aberration is within ±2.5%. The components in the fourth example are similar to those in the first example, but the optical data such as the curvature radius, the refractive power, the lens thickness, the lens focal length, the aspheric surface or the back focal length in this example are different from the optical data in the first example. The optical data of the fourth example of the optical imaging lens set are shown in FIG. 28 while the aspheric surface data are shown in FIG. 29. The length of the optical imaging lens set is 4.382 mm. Image height is 2.934 mm, HFOV is 38.023 degrees. Compared with the first example, this example has some advantages such as having shorter total length and having larger HFOV. Some important ratios of the fourth example are as follows:

$|V1-V3|=33.717$ $EFL/(G34+G45)=3.670$ $AAG/T3=4.597$ $G34/G45=1.203$ $(G12+G23)/T2=1.914$ $AAG/G34=2.531$ $(T1+T3)/T2=4.116$ $EFL/T4=7.232$ $(G23+G45)/T4=1.492$ $ALT/(T2+T5)=3.259$ $(T1+T5)/G23=3.003$ $ALT/T1=3.677$ $(T4+T5)/G23=2.956$ $AAG/(T1+T2)=1.916$ $T5/G23=1.283$

Fifth Example

Figure 14:
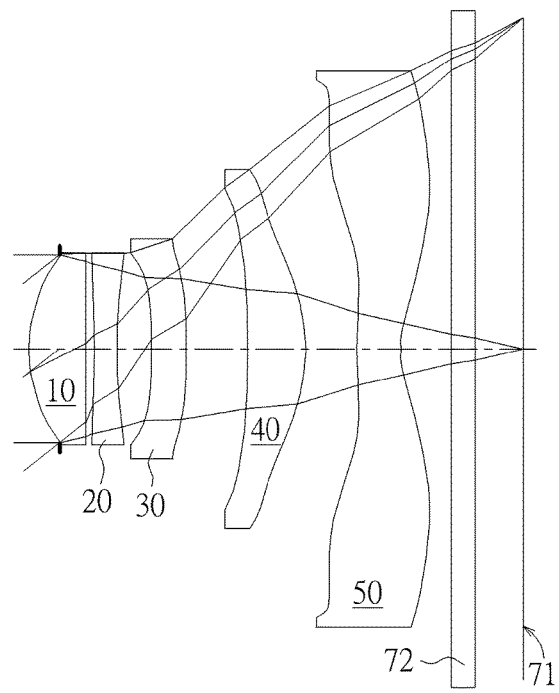
FIG. 14 illustrates a fifth example of the optical imaging lens set of five lens elements of the present invention.
Figures 15A, 15B, 15C, 15D:
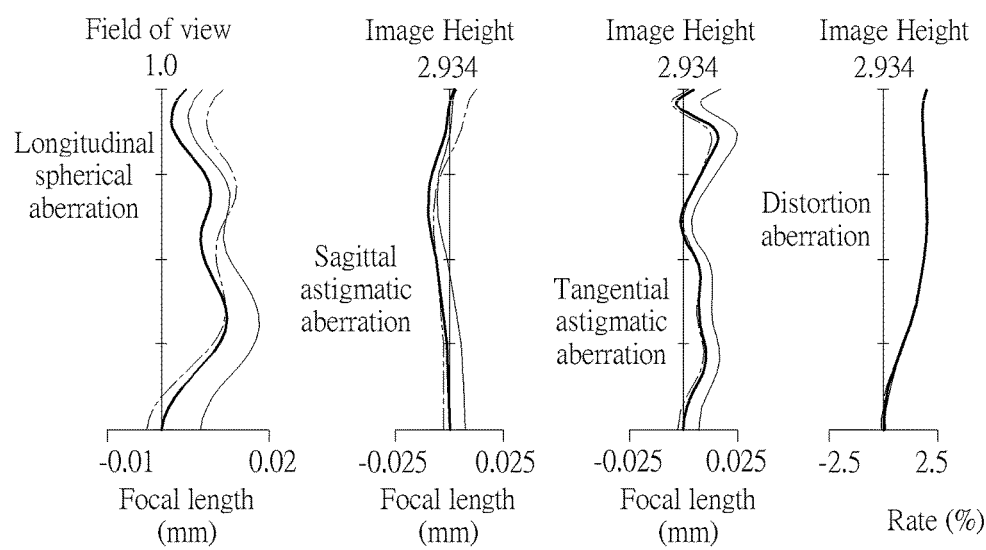
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. In this example, the deviation of the longitudinal spherical aberration is within ±0.02 mm. The focal length variation of the astigmatic field aberration on the sagittal direction is within ±0.025 mm; the focal length variation of the astigmatic field aberration on the tangential direction is within ±0.03 mm; and the distortion aberration is within ±2.5%. The components in the fifth example are similar to those in the first example, but the optical data such as the curvature radius, the refractive power, the lens thickness, the lens focal length, the aspheric surface or the back focal length in this example are different from the optical data in the first example. The optical data of the fifth example of the optical imaging lens set are shown in FIG. 30 while the aspheric surface data are shown in FIG. 31. The length of the optical imaging lens set is 4.392 mm. Image height is 2.934 mm, HFOV is 38.097 degrees. Compared with the first example, this example has some advantages such as having shorter total length and having larger HFOV. Some important ratios of the fifth example areas follows:

$|V1-V3|=33.717$ $EFL/(G34+G45)=3.632$ $AAG/T3=4.597$ $G34/G45=1.212$ $(G12+G23)/T2=1.938$ $AAG/G34=2.527$ $(T1+T3)/T2=4.020$ $EFL/T4=7.082$ $(G23+G45)/T4=1.471$ $ALT/(T2+T5)=3.237$ $(T1+T5)/G23=2.926$ $ALT/T1=3.819$ $(T4+T5)/G23=2.980$ $AAG/(T1+T2)=1.992$ $T5/G23=1.282$

Sixth Example

Figure 16:
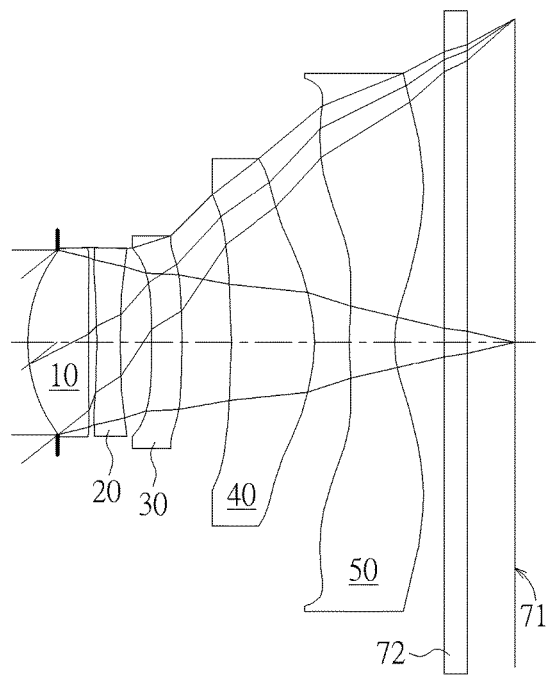
FIG. 16 illustrates a sixth example of the optical imaging lens set of five lens elements of the present invention.
Figures 17A, 17B, 17C, 17D:
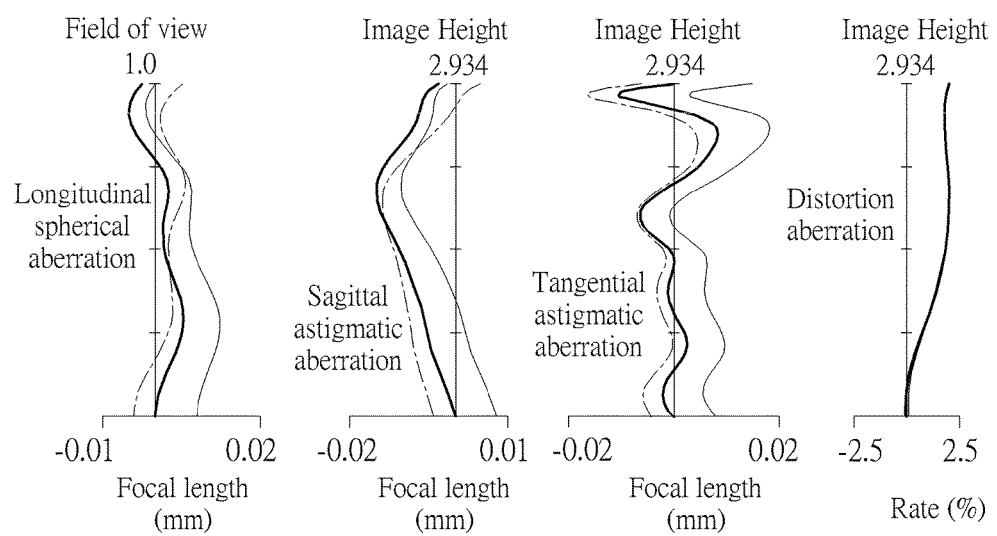
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. In this example, the deviation of the longitudinal spherical aberration is within ±0.02 mm. The focal length variation of the astigmatic field aberration on the sagittal direction is within ±0.02 mm; the focal length variation of the astigmatic field aberration on the tangential direction is within ±0.02 mm; and the distortion aberration is within ±2.5%. The components in the sixth example are similar to those in the first example, but the optical data such as the curvature radius, the refractive power, the lens thickness, the lens focal length, the aspheric surface or the back focal length in this example are different from the optical data in the first example. The optical data of the sixth example of the optical imaging lens set are shown in FIG. 32 while the aspheric surface data are shown in FIG. 33. The length of the optical imaging lens set is 4.434 mm.

Image height is 2.934 mm, HFOV is 38.029 degrees. Compared with the first example, this example has some advantages such as having shorter total length and having larger HFOV. Some important ratios of the sixth example are as follows:

$|V1-V3|=33.717$ $EFL/(G34+G45)=4.791$ $AAG/T3=4.200$ $G34/G45=1.441$ $(G12+G23)/T2=1.728$ $AAG/G34=2.499$ $(T1+T3)/T2=3.900$ $EFL/T4=4.819$ $(G23+G45)/T4=0.787$ $ALT/(T2+T5)=3.540$ $(T1+T5)/G23=3.378$ $ALT/T1=3.990$ $(T4+T5)/G23=4.106$ $AAG/(T1+T2)=1.479$ $T5/G23=1.443$

Seventh Example

Figure 18:
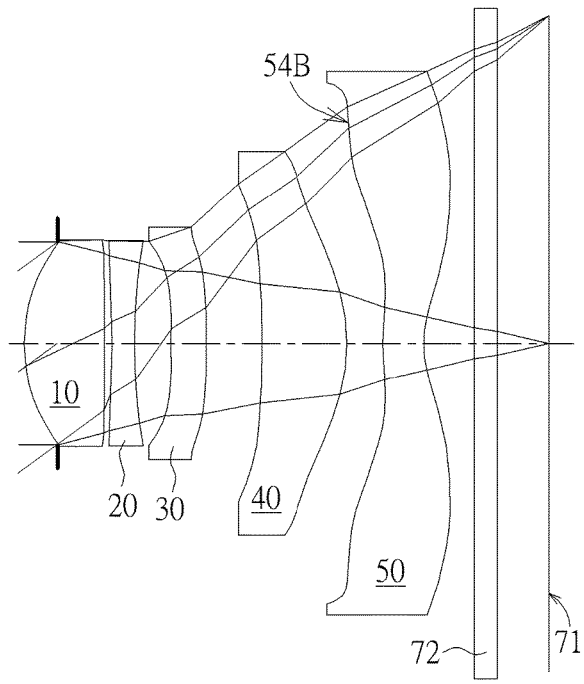
FIG. 18 illustrates a seventh example of the optical imaging lens set of five lens elements of the present invention.
Figures 19A, 19B, 19C, 19D:
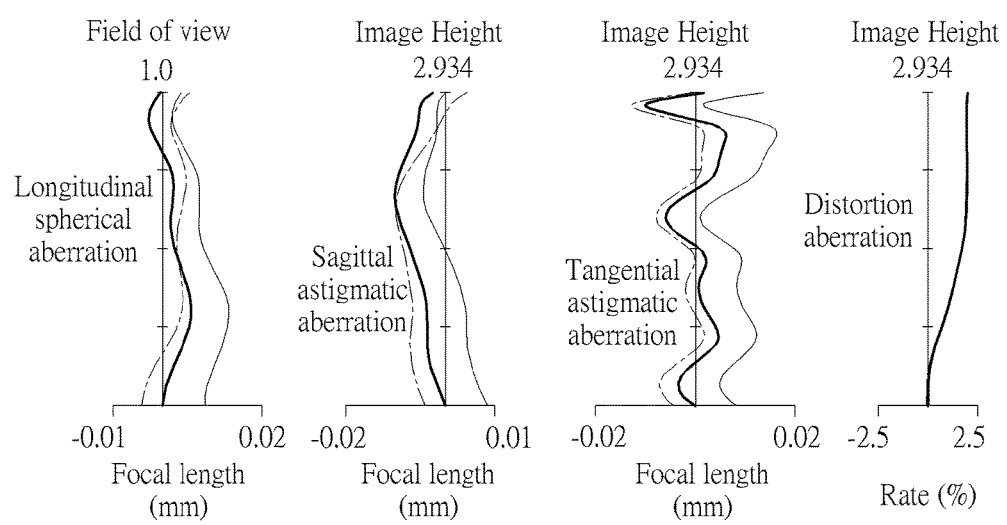
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. In this example, the deviation of the longitudinal spherical aberration is within ±0.015 mm. The focal length variation of the astigmatic field aberration on the sagittal direction is within ±0.015 mm; the focal length variation of the astigmatic field aberration on the tangential direction is within ±0.02 mm; and the distortion aberration is within ±2.5%. The components in the seventh example are similar to those in the first example, but the optical data such as the curvature radius, the refractive power, the lens thickness, the lens focal length, the aspheric surface or the back focal length in this example are different from the optical data in the first example, and in this example, the fifth object-side surface 51 the fifth lens element 50 has a concave part 54B in a vicinity of its circular periphery. The optical data of the seventh example of the optical imaging lens set are shown in FIG. 34 while the aspheric surface data are shown in FIG. 35. The length of the optical imaging lens set is 4.715 mm. Image height is 2.934 mm, HFOV is 35.805 degrees. Some important ratios of the seventh example are as follows:

$|V1-V3|=33.717$ $EFL/(G34+G45)=4.798$ $AAG/T3=3.900$ $G34/G45=1.534$ $(G12+G23)/T2=2.005$ $AAG/G34=2.449$ $(T1+T3)/T2=5.154$ $EFL/T4=5.202$ $(G23+G45)/T4=0.855$ $ALT/(T2+T5)=4.193$ $(T1+T5)/G23=3.292$ $ALT/T1=3.300$ $(T4+T5)/G23=3.448$ $AAG/(T1+T2)=1.346$ $T5/G23=1.108$

Some important ratios in each example are shown in FIG. 36.

In the light of the above examples, the inventors observe the following features:

1. The first lens element has positive refractive power, helping to collect the image light. In addition, the aperture stop is disposed between the object side and the first lens element, so as to enlarge the field of view and to reduce the total length.

2. As mentioned above, each lens element in the optical imaging lens set of the present invention has an object-side surface facing toward the object side as well as an image-side surface facing toward the image side. The second lens element has an image-side surface with a concave part in a vicinity of its periphery, and the third lens element has an object-side surface with a concave part in a vicinity of its periphery, those two surfaces match each other, so as to eliminate the field curvature and the distortion. The fourth lens element has positive refracting power, the fourth lens has an object-side surface with a concave part in a vicinity of the optical axis, and a concave part in a vicinity of its periphery; the fourth lens further has an image-side surface with a convex part in a vicinity of its periphery, also helping to correct aberration. The fifth lens element has negative refracting power, the fifth lens element has object-side surface with a convex part in a vicinity of the optical axis, the fifth lens element further has image-side surface with a concave part in a vicinity of the optical axis and a convex part in a vicinity of its periphery, this arrangement helps to correct the light emitted angle onto the image plane. Each of the surfaces mentioned above match each other, in order to improve the aberration and image quality as well as reduce the total length.

In addition, the inventors discover that there are some better ratio ranges for different data according to the above various important ratios. Better ratio ranges help the designers to design the better optical performance and an effectively reduced length of a practically possible optical imaging lens set. For example:

(1) If the relationship of $|V1-V3|≥20$ is satisfied, the aberration and image quality can be improved.
(2) If the optical imaging lens set has smaller EFL, the total length can be reduced, and the HFOV can be enlarged, therefore if the following relationship is satisfied:

$$EFL/(G34+G45)≥4.8,$$

preferably, the range is between 3.5-4.8;

$$EFL/T4≤7.1,$$

preferably, the range is between 4.5-7.1, the optical imaging lens set will have a better arrangement.
(3) The first lens element has positive refractive power, helping to collect the image light. Therefore the thickness of the first lens element cannot be too small. Preferably, the first lens element has a relative thicker thickness, and also satisfies the following relationship:

$$(T1+T3)/T2≥3.3,$$

preferably, the range is between 3.3-5.2;

$$(T1+T5)/G23≥2.6,$$

preferably, the range is between 2.6-3.5;

$$ALT/T1≤4.0,$$

preferably, the range is between 3.3-4.0;

$$AAG/(T1+T2)≤2.0,$$

preferably, the range is between 1.3-2.0.
(4) In order to shrink the optical imaging lens set, the air gaps between two adjacent lenses and the thickness of the lens element will be shrunk as much as possible, but considering the difficulties during the assembling process, the air gaps and the thickness cannot be shrunk unlimitedly. If the following relationships are satisfied, the optical imaging lens set has better arrangement:

$$AAG/T3≤4.6,$$

preferably, the range is between 3.9-4.6;

$$G34/G45≥0.9,$$

preferably, the range is between 0.9-1.6;

$$(G12+G23)/T2≤2.1,$$

preferably, the range is between 1.5-2.1;

$$AAG/G34≤3.5,$$

preferably, the range is between 2.4-3.5;

$$(G23+G45)/T4≤1.5,$$

preferably, the range is between 0.7-1.5;

$$ALT/(T2+T5)≥2.9,$$

preferably, the range is between 2.9-4.2;

$$(T4+T5)/G23≥2.7,$$

preferably, the range is between 2.7-4.2;

$$T5/G23≥1.1,$$

preferably, the range is between 1.1-1.5.

Figure 20:
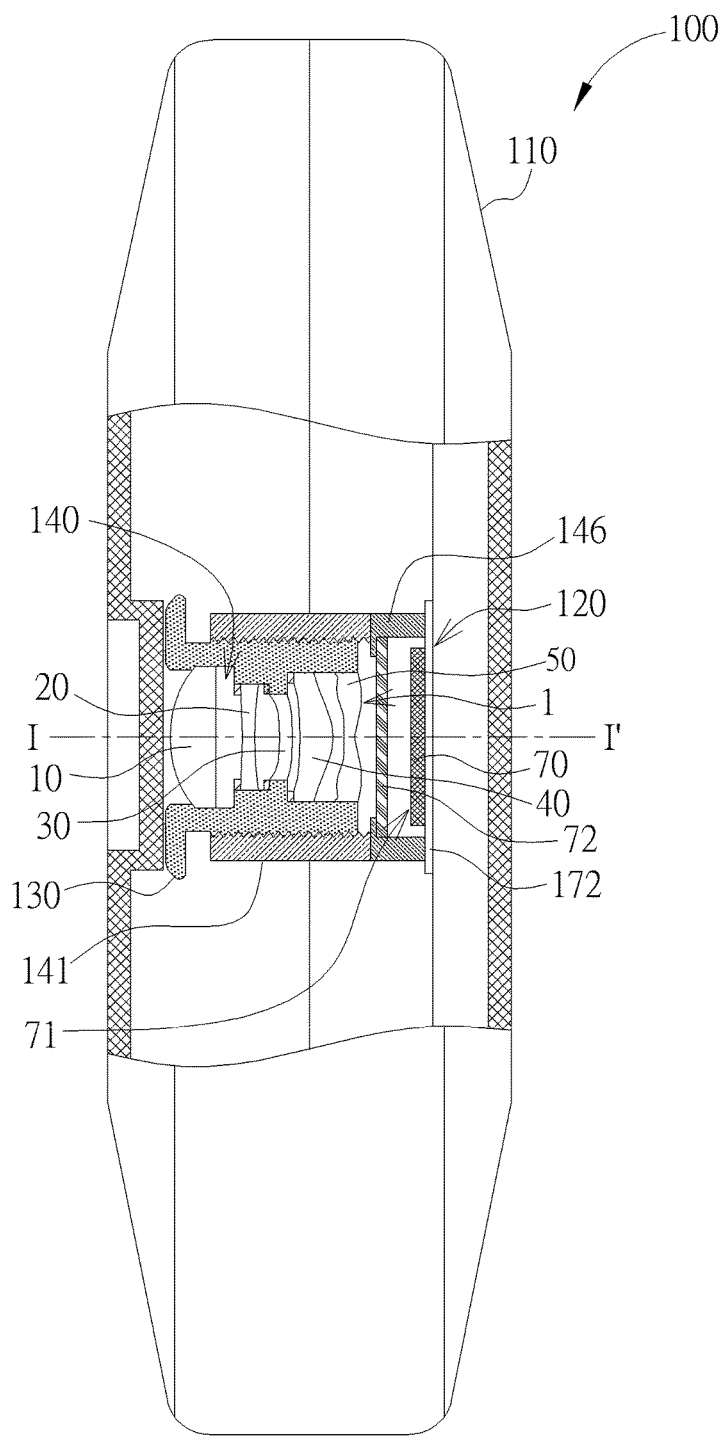
FIG. 20 illustrates a first preferred example of the portable electronic device with an optical imaging lens set of the present invention.

The optical imaging lens set 1 of the present invention may be applied to an electronic device, such as game consoles or driving recorders. Please refer to FIG. 20. FIG. 20 illustrates a first preferred example of the optical imaging lens set 1 of the present invention for use in a portable electronic device 100. The electronic device 100 includes a case 110, and an image module 120 mounted in the case 110.

A driving recorder is illustrated in FIG. 20 as an example, but the electronic device 100 is not limited to a driving recorder.

As shown in FIG. 20, the image module 120 includes the optical imaging lens set 1 as described above. FIG. 20 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 21:
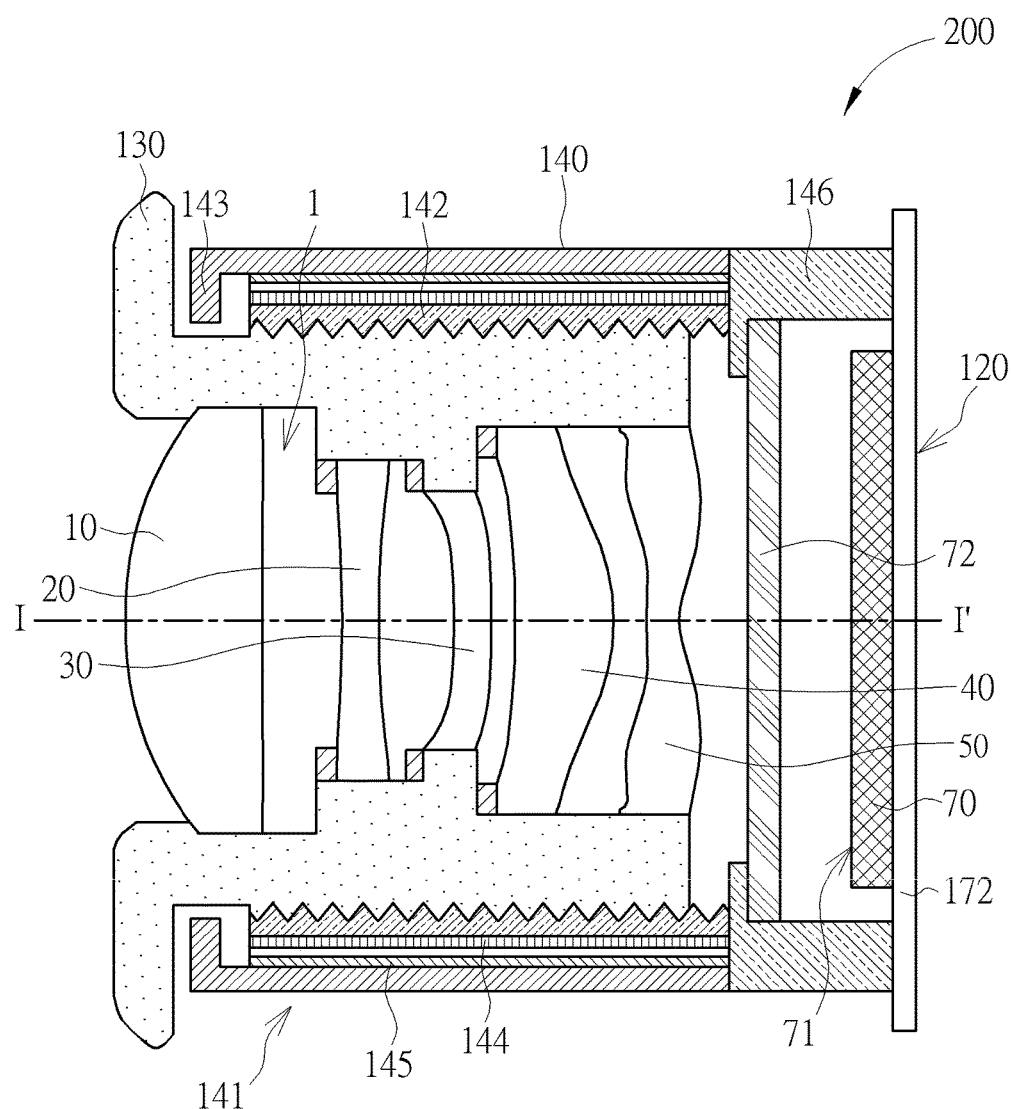
FIG. 21 illustrates a second preferred example of the portable electronic device with an optical imaging lens set of the present invention.

Please also refer to FIG. 21 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: an aperture stop, a first lens element, a second lens element, a third lens element, a fourth lens element and a fifth lens element, each lens element having refractive power, and having an object-side surface facing toward the object side as well as an image-side surface facing toward the image side, wherein:

the first lens element has positive refracting power;
the second lens element has an image-side surface with a concave part in a vicinity of its periphery;
the third lens element has an object-side surface with a concave part in a vicinity of said optical axis and a concave part in a vicinity of its periphery;
the fourth lens has positive refracting power, having an object-side surface with a concave part in a vicinity of said optical axis and a concave part in a vicinity of its periphery, and further has an image-side surface with a convex part in a vicinity of its periphery;
the fifth lens element has negative refracting power, having an object-side surface with a convex part in a vicinity of said optical axis, and further has image-side surface with a concave part in a vicinity of said optical axis and a convex part in a vicinity of its periphery; and
the optical imaging lens set does not include any lens element with refractive power other than said first, second, third, fourth and fifth lens elements; an air gap AG23 between said second lens element and said third lens element along said optical axis, a thickness T1 of said first lens element along said optical axis, and a thickness T4 of said fourth lens element along said optical axis, an air gap AG34 between said third lens element and said fourth lens element along said optical axis, an air gap AG45 between said fourth lens element and said fifth lens element along said optical axis, a total thickness ALT of said first lens element, said second lens element, said third lens element, said fourth lens element and said fifth lens element along said optical axis, an effective focal length EFL of the optical imaging lens set, an Abbe number V1 of the first lens element, and an Abbe number V3 of the third lens element satisfy the relationships: $(G23+G45)/T4 \leq 1.5$, $33.717 \geq |V1-V3| \geq 20$, $ALT/T1 \leq 4.0$, and $EFL/(G34+G45) \leq 4.8$.

2. The optical imaging lens set of claim 1, wherein a sum of all four air gaps AAG between each lens element from said first lens element to said fifth lens element along said optical axis, and a thickness T3 of said third lens element along said optical axis satisfy a relationship $AAG/T3 \leq 4.6$.

3. The optical imaging lens set of claim 2, further satisfying a relationship $1.6 \geq G34/G45 \geq 0.9$.

4. The optical imaging lens set of claim 1, wherein an air gap AG12 between said first lens element and said second lens element along said optical axis, and a thickness T2 of said second lens element along said optical axis satisfy a relationship $(G12+G23)/T2 \leq 2.1$.

5. The optical imaging lens set of claim 4, wherein a sum of all four air gaps AAG between each lens element from said first lens element to said fifth lens element along said optical axis satisfies a relationship $AAG/G34 \leq 3.5$.

6. The optical imaging lens set of claim 1, wherein a thickness T3 of said third lens element along said optical axis, and a thickness T2 of said second lens element along said optical axis satisfy a relationship $5.2 \geq (T1+T3)/T2 \geq 3.3$.

7. The optical imaging lens set of claim 6, further satisfying a relationship $EFL/T4 \leq 7.1$.

8. The optical imaging lens set of claim 1, wherein a thickness T2 of said second lens element along said optical axis, and a thickness T5 of said fifth lens element along said optical axis satisfy a relationship $4.2 \geq ALT/(T2+T5) \geq 2.9$.

9. The optical imaging lens set of claim 1, wherein a thickness T5 of said fifth lens element along said optical axis satisfy a relationship $3.5 \geq (T1+T5)/G23 \geq 2.6$.

10. The optical imaging lens set of claim 1, wherein a thickness T5 of said fifth lens element along said optical axis satisfies a relationship $4.2 \geq (T4+T5)/G23 \geq 2.7$.

11. The optical imaging lens set of claim 1, wherein a sum of all four air gaps AAG between each lens element from said first lens element to said fifth lens element along said optical axis, and a thickness T2 of said second lens element along said optical axis satisfy a relationship $AAG/(T1+T2) \leq 2.0$.

12. The optical imaging lens set of claim 11, wherein a thickness T5 of said fifth lens element along said optical axis satisfies a relationship $1.5 \geq T5/G23 \geq 1.1$.

13. An electronic device, comprising:
a case; and
an image module disposed in said case and comprising:
an optical imaging lens set of claim 1;
a barrel for an installation of said optical imaging lens set;
a module housing unit for an installation of said barrel;
a substrate for an installation of said module housing unit; and
an image sensor disposed on the substrate and disposed at an image side of said optical imaging lens set.

* * * * *